United States Patent
Pantaleoni

(10) Patent No.: US 8,576,227 B1
(45) Date of Patent: *Nov. 5, 2013

(54) SYSTEM AND METHOD FOR ESTIMATING LIGHT TRANSPORT USING BIDIRECTIONAL PATH TRACING

(75) Inventor: Jacopo Pantaleoni, Berlin (DE)

(73) Assignee: NVIDIA Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/597,186

(22) Filed: Aug. 28, 2012

Related U.S. Application Data

(63) Continuation of application No. 12/475,782, filed on Jun. 1, 2009, now Pat. No. 8,279,220.

(51) Int. Cl.
 *G06T 15/50* (2011.01)
(52) U.S. Cl.
 USPC ............................ 345/426; 345/419; 345/420
(58) Field of Classification Search
 USPC .......................................................... 345/426
 See application file for complete search history.

(56) References Cited

PUBLICATIONS

Veach E., "Robust Monte Carlo Methods for Light Transport Simulation", Standford Univerisity, 1997, pp. 1-433.*
Ren Ng et al.; Power-point Slides for "All-Frequency Shadows Using Non-Linear Wavelet Lighting Approximation"; ACM Transactions on Graphics, Jul. 2003; http://graphics.stanford.edu/papers/allfreq/ ; Slides 12-13, 15-16, 31-32.*

* cited by examiner

*Primary Examiner* — Said Broome
*Assistant Examiner* — Peter Hoang
(74) *Attorney, Agent, or Firm* — Zilka-Kotab, PC

(57) ABSTRACT

Systems and methods for estimating light transport between respective points includes selecting a plurality of first sub-paths extending the first point A. and selecting a plurality of second sub-paths extending from a second point B. A plurality of transport paths are constructed, wherein each one of the plurality of the first sub-paths is coupled to a respective one of the plurality of second paths, and wherein each transport path comprises one first sub-path and one second sub-path. Two or more of the transport paths are sampled, and a light transport value for each of the sampled transport paths is calculated to estimate the light transported between first point A and second point B.

27 Claims, 6 Drawing Sheets

SYSTEM AND METHOD FOR ESTIMATING LIGHT TRANSPORT USING BIDIRECTIONAL PATH TRACING

RELATED APPLICATION(S)

The present application is a continuation of U.S. application Ser. No. 12/475,782, filed Jun. 1, 2009, which is incorporated herein by reference in its entirety.

FIELD OF THE INVENTION

The present invention relates to systems and methods for estimating light transport, and more specifically, to systems and methods implementing a bidirectional path tracing method for estimating light transport.

BACKGROUND

Light transport simulations are implemented in visual computing and computer graphics applications such as ray tracing, but unfortunately such simulations remain a computationally challenging task. Several approaches have been introduced which convert indirect lighting into direct lighting using many light sources on many shading samples, and apply sophisticated algorithms to reduce the complexity of the resulting many-light problem by exploiting the intrinsic low-rank nature of the resulting transport matrix. Some of these approaches have been described by B. Walter, A. Arbree, K. Bala, and P. Greenberg in the publication "Multi-dimensional Lightcuts" (SIGGRAPH 2006), and by M. Hasan, F. Pellacini, and K. Bala in the publication "Matrix Row-Column Sampling for the Many Light Problem" (SIGGRAPH 2007). However, due to the unidirectional nature of the indirect to direct conversion process which is essentially based on photon tracing, some phenomena such as sharp glossy reflections and refractions are still very difficult to handle. Moreover, the conversion process introduces weak singularities which need to be removed through clamping, thus introducing bias.

In contrast, bidirectional path tracing, as disclosed by E. Veach in the Ph.D. dissertation entitled "Robust Monte Carlo Methods for Light Transport Simulation," (Stanford University, December 1997), treats light transport as an integration problem in the space of all possible paths, and provides a Monte Carlo bidirectional path sampling approach which, connecting entire sub-paths traced independently from the light and the eye respectively, can smoothly handle different kinds of transport. Additionally, using Multiple Importance Sampling the algorithm can efficiently remove weak singularities and highly improve the convergence rate without introducing any bias.

The bidirectional path tracing method samples and processes individual transport paths and does not exploit any intrinsic coherence in the underlying light field. To the contrary, as full paths are constructed by connecting vertices of independent sub-paths which have no intrinsic spatial relation, the method prevents a full exploitation of stratified sampling.

What is needed is a method and system operable to estimate light transport which is more efficient and more amenable to applicable sampling techniques.

SUMMARY

A system and method for estimating the light transported between a first point A and a second point B is now presented which seeks to address the aforementioned deficiencies. The method includes selecting a plurality of first sub-paths extending the first point A, and also selecting a plurality of second sub-paths extending from a second point B. A plurality of transport paths are constructed, wherein each one of the plurality of the first sub-paths is coupled to a respective one of the plurality of second paths, and wherein each transport path comprises one first sub-path and one second sub-path. Two or more of the transport paths are sampled, and a light transport value for each of the sampled transport paths is calculated to estimate the light transported between first point A and second point B.

These any other features of the invention will be better understood in view of the following figures and corresponding description of exemplary embodiments.

Figure 1:
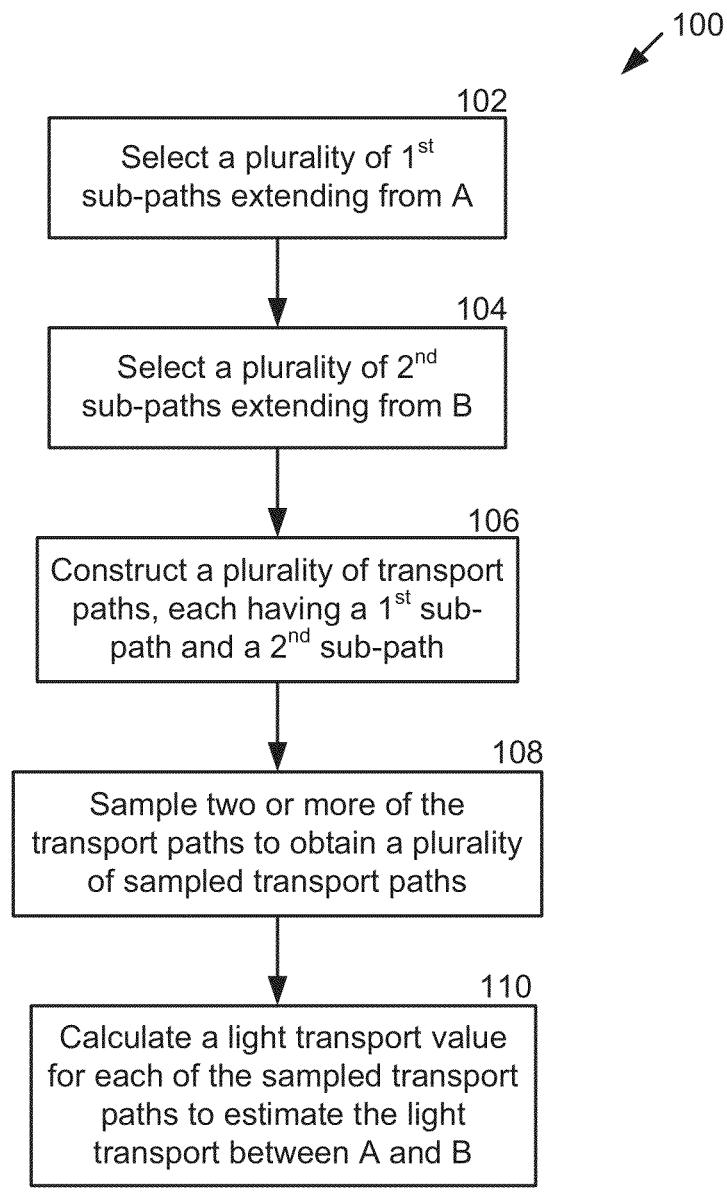
FIG. 1 illustrates a method for estimating the light transport between points A and B in accordance with the present invention.

For clarity, previously described features retain their reference indicia in subsequent drawings.

DETAILED DESCRIPTION OF EXEMPLARY EMBODIMENTS

Light transport simulation can be expressed as the problem of computing a set of measurements, usually corresponding to the pixels of an image as seen by a virtual eye or camera:

$$I_j = \sum_{k=1}^{\infty} \int_{M^{k+1}} f_j(x_0 \ldots x_k) dA(x_0) \ldots dA(x_k) \quad (1)$$

where:
M is the set of 3-dimensional surfaces comprising a scene;
dA is the standard surface area measure;
integrands $f_j$ are the measurement contribution functions defined by:

$$f_j(x_0 \ldots x_k) = f(x_0 \ldots x_k) W_e^{(j)}(x_{k-1} \leftrightarrow x_k) \quad (2)$$

$$f_j(x_0 \ldots x_k) = \quad (3)$$

$$L_e(x_0 \to x_1) G(x_0 \leftrightarrow x_1) \prod_{i=1}^{k-1} f_s(x_{i-1} \to x_i \to x_{i+1}) G(x_i \leftrightarrow x_{i+1})$$

where:

$w_e^{(j)}(x \to y)$ is the importance emission function corresponding to the $j^{th}$ measurement as described in the aforementioned 1997 Veach reference;

$L_e(x \to v)$ is the emitted radiance from x to y;

$G(x \leftrightarrow y)$ is the geometric form factor between the differential surface elements x and y; and $f_s(x \to y \to z)$ represents the bidirectional scattering distribution function (BDSF) at y.

Using the path integral notation introduced in the aforementioned 1997 Veach reference, equation (1) can also be rewritten as a simple integral in the space of all possible paths:

$$I_j = \int_\Omega f_j(\bar{x}) d\mu(\bar{x}) \quad (4)$$

where:

$\Omega$ is the path space formed by all paths of all finite lengths $\Omega = \cup_{k=1}^\infty \Omega_k$;

$d\mu(\bar{x}) = dA(x_0) \ldots dA(x_k)$ if $\bar{x} \in \Omega_k$ is a path with vertices $x_0 \ldots x_k$; and $f_j(\bar{x})$ is the measurement contribution function $f_j(x_0 \ldots x_k)$ for any $\bar{x} = x_0 \ldots x_k \in \Omega_k$.

Bidirectional path tracing evaluates the integrals from equation (4) using a Monte Carlo sampling technique which assembles together individual paths by connecting two independent sub-paths: (i) a light sub-path which starts at a light source and is generated through standing light tracing, and (ii) a eye sub-path which starts at the lens and is generated through standard particle tracing.

In the conventional approach discussed in the aforementioned 1997 Veach reference, bidirectional path tracing samples a single light sub-path and a single eye sub-path at a time, and combines the two using the formula:

$$F_j(\bar{x}) = \sum_{s,t} w_{s,t}(\bar{x}_{s,t}) \frac{f_j(\bar{x}_{s,t})}{p(\bar{x}_{s,t})} \quad (5)$$

where:

$\bar{x}_{s,t} = y_0 \ldots y_s z_t \ldots z_0$;

$p(\bar{x}_{s,t}) = p_{s,t}(\bar{x}) = p_L(y_0 \ldots y_s) p_E(z_t \ldots z_0)$ is the probability density function for the sampling technique (s,t) used to generated paths with s+1 light sub-paths and t+1 eye sub-paths, respectively;

$w_{s,t}(\bar{x}_{s,t})$ is the multiple importance sample weight for the sampling technique (s,t) referred to in the aforementioned 1997 Veach reference.

The integrals $I_j$ are approximated by a simple Monte Carlo sum:

$$I_j \approx \frac{1}{N} \sum_{i=1}^N F_j(\bar{x}_i) \quad (6)$$

Because the light sub-paths and eye sub-paths are sampled independently, usage of stratified random sampling for generating the individual sub-paths cannot achieve good spatial stratification in the path space, since the endpoints of the two sub-paths do not have an intrinsic spatial relation. This is true even for Quasi Monte Carlo variants, which implement either independent randomization or two de-correlated sample sequences for the light and eye sub-path samplers in order to remove otherwise visibly disturbing correlation artifacts.

A consequence of the aforementioned conventional bidirectional path tracing technique is that the convergence error cannot be brought down to the optimal O(1/n) in the number of samples n, even if it were possible to achieve good stratification in the very high dimensional primary sample spaces underlying the individual sub-path sampling techniques.

In accordance with the present invention, a new global sampling technique is presented, whereby instead of generating for each iteration a single light sub-path $\bar{y} = y_0 \ldots y_{n_{q-1}}$ and a single eye sub-pat $\bar{z} = z_0 \ldots z_{n_{E-1}}$ and connecting the two, two large families $$Y = \{\bar{y}^{(p)}\}_{p=1}^N$$

and $$Z = \{\bar{z}^{(q)}\}_{q=1}^N$$

of N such light and eye sub-paths are generated, and the connections between all of their respective vertices are considered.

FIG. 1 illustrates an exemplary method 100 for estimating the light transport between points A and B in accordance with the present invention. At 102, a plurality of first sub-paths extending from a first point A are selected, and at 104, a plurality of second sub-paths extending from a second point B 104 is selected. At 106, a plurality of transport paths is constructed, whereby each one of the plurality of the first sub-paths is coupled to each one of the plurality of second paths. At 108, a plurality of the transport paths constructed at 106 is sampled to obtain a plurality of sampled light transport paths. At 110, a light transport value is calculated for each of the plurality of sampled transport paths selected at 108 to estimate the light transported between first point A and second point B.

In an exemplary embodiment, the first sub-paths constitute a plurality of Y light sub-paths, and the second sub-paths constitute a plurality of Z eye sub-paths, although this arrangement may be reversed. The quantities Y and Z representing the number of the first and second sub-paths, respectively, may range from two to any number, an exemplary range ranging from ten thousand to ten million and in a more specific embodiment, ranges from 100,000 to 1,000,000. The number of first and second sub-paths may be equal, and in other embodiments they may be unequal. Any means may be implemented for selecting the first and second sub-paths, e.g., random selection.

Further specifically, each of the first or second sub-paths may contain one or more vertices. In a particular embodiment, the number of vertices included within a sub-path ranges from one to one thousand, and in a particular embodiment ranges from 1 to 50. A sub-path having one vertex (typically enumerated with the number zero in the lower index) has a sub-path length of zero.

In the illustrated exemplary embodiment in which a plurality of Y first sub-paths and plurality of Z sub-paths are selected, operation 106 will include constructing a plurality of Y×Z of transport paths. In a further specific embodiment of this operation, a two dimensional representation is made of the connection between the first and second sub-path, one such representation being a matrix form, as further described and illustrated below.

Operation 108, in which a plurality of the light transport values are sampled, may be carried out by sampling a plurality of Y×Z of transport paths using a variety of different sampling techniques, including randomly sampling, stratified sampling, and latin hyper-cube sampling. Other techniques, such as Quasi Monte Carlo sampling may also be used as well.

Operation 110 may be carried out by computing estimator of pixel $I_j$ using equation 12 below.

Figure 2:
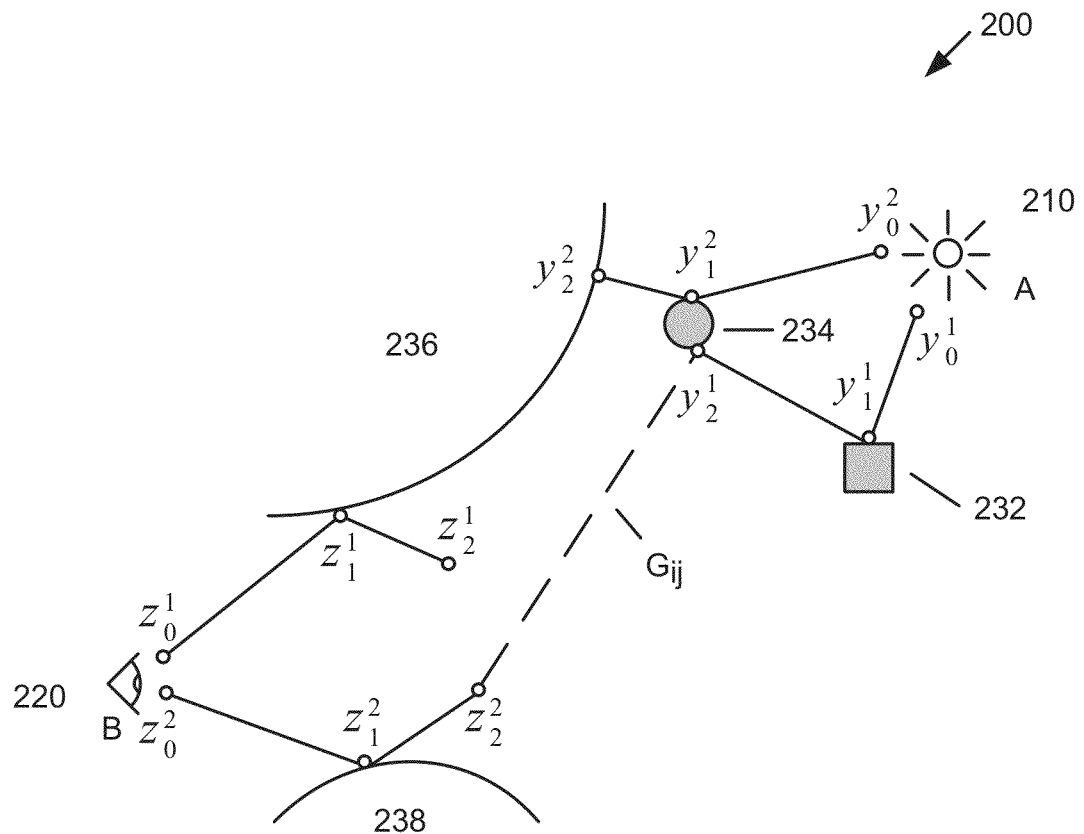
FIG. 2 illustrates the method of FIG. 1 in accordance with the present invention.

FIG. 2 illustrates the method of FIG. 1 in accordance with the present invention. The construct 200 includes a light source 210, representing a first point A, and a sensor 220, representing a second point B. The construct 200 further includes surfaces 232, 234, 236 and 238, from which the sub-paths reflect.

As illustrated, there area total of six first sub-paths $y_0^1$, $y_1^1$, $y_2^1$, $y_0^2$, $y_1^2$, $y_2^2$ extending from point A 210, and six second sub-paths $z_0^1$, $z_1^1$, $z_2^1$, $z_0^2$, $z_1^2$, $z^2$ extending from point B. As shown, the lower index indicates the terminating or end vertex of the sub-path. For example, the sub-path $y_2^1$ represents a sub-path extending to vertex $y_2^1$, including intermediate vertices $y_0^1$ and $y_1^1$. For clarity, the term "sub-path $y_2^1$" is used to refer to the complete sub-path that includes starting and intermediate vertices $y_0^1$ and $y_1^1$, whereas the term "vertex $y_2^1$" is used to refer to the particular vertex point $y_2^1$ itself. It is noted that sub-paths $y_0^1$, $y_0^2$, $z_0^1$, $z_0^2$ are each a single vertex, zero length sub-path. In general, each first sub-path $y_s^p$ is defined by a path index p and a length defined by terminating vertex s, and each second sub-path $z_t^q$ is defined by a path index q and a length defined by terminating vertex t. A term "sampling technique (s,t)" refers to the pseudo-random or quasi-random sampling process through which a plurality of paths are generated, each path including a light subpath of length s and an eye subpath of length t.

Operation 106 may be performed by constructing a light transport matrix G in which the first sub-paths defines respective column indices and the second sub-paths defines respective row indices. In such an embodiment, the light tranport matrix G includes an entry $G_{ij}$ defined by a respective column index i and a respective row index j, the entry $G_{ij}$ having a light transport value which describes the light transported between points A and B via a light transport path composed of a combination of a first sub-path corresponding to column index i, and a second sub-path corresponding to row index j. Referring to FIG. 2 as an example, light sub-path $y_2^1$ represents column index of matrix G, eye sub-path $z_2^2$ represents column index j, and entry $G_{ij}$ being a value representing the light transport (light level/color/intensity) between these two sub-paths, the connection therebetween indicated by a dashed line in FIG. 2. The value $G_{ij}$ may be of any particular format or value, e.g., a 24 bit R/G/B color, YUV, grayscale, or any other analog or digital color space format.

Further exemplary of operation 106, the first sub-paths are sorted into different groups, each group including first sub-paths $y_s^p$ of the same length (i.e., group members having the same number of vertices s) and of varying path indices p. The second sub-paths $z_t^q$ are similarly sorted into groups of the same length (groups having the same number of vertices t) and varying path indices q (the sub-paths are distinct). One first sub-path group and one second sub-path group forms respective column and row indices of a sub-matrix $M_{(r,q)}^{(s,p)}$ of the light transport matrix T.

Figure 3:
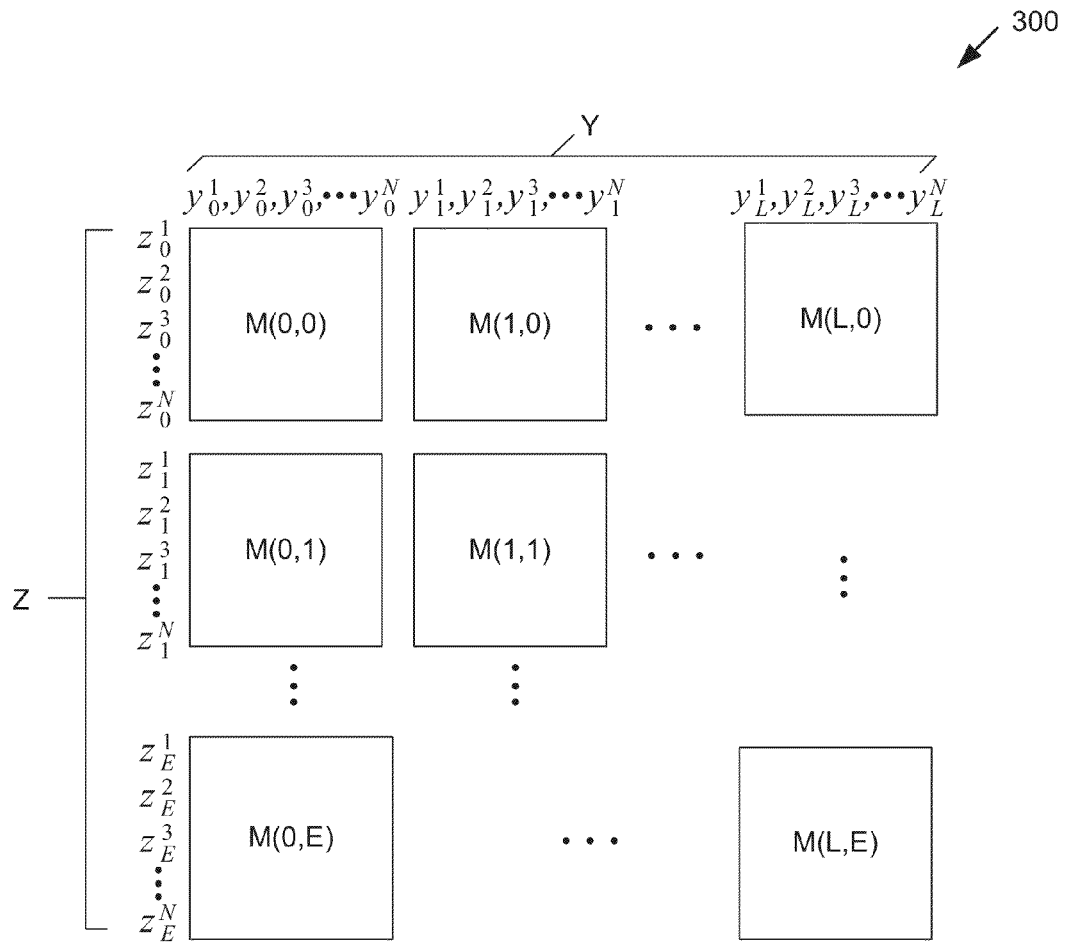
FIG. 3 illustrates a light transform matrix implemented in accordance with FIG. 1.

FIG. 3 illustrates a light transform matrix 300 implemented in accordance with the present invention. The light transform matrix G 300 includes column indices defined by light sub-paths Y and row indices defined by eye sub-paths Z. The light sub-paths Y are arranged in L groups of light sub-paths $y_s^p$, each group including light sub-paths of the same length s and varying path indices p. Similarly, the eye sub-paths Z are arranged in E groups of eye sub-paths $z_t^q$, each of the E groups having the same length t and varying path indices q. Further, one of each group is implemented as respective column and row indices of a sub-matrix M(x,y).

As an example, sub-matrix M(1,0) is composed of column indices defined by a group of first sub-paths $y_1^1$, $y_1^2$, $y_1^3$ ... $y_n^N$, and row indices defined by a group of second sub-paths $z_0^1$, $z_0^2$, $z_0^3$ ... $z_0^N$. The first sub-path group $y_1^1$, $y_1^2$, $y_1^3$ ... $y_1^N$ is composed of N different path indices or samples (varying upper index), each sub-path extending one segment length away from light source 210 A. The second sub-path group $z_0^1$, $z_0^2$, $z_0^3$ ... $z_0^N$ is composed of N different path indices or samples, each sub-path consisting of a vertex only (i.e., zero sub-path length), these vertices distributed around the sensor 220 B. Accordingly, the entries of this sub-matrix M(1,0) will represent the light transport between each of the first (light) sub-paths $y_1^1$, $y_1^2$, $y_1^3$ ... $y_1^N$ and each of the second (eye) sub-paths $z_0^1$, $z_0^2$, $z_0^3$ ... $z_0^N$. For example, if entry $M(1,0)_{1,1}$ has a value of zero, no light is transported between sub-paths $y_1^1$ and $z_0^1$.

Said in another way, the aforementioned processing may be performed using a representation of light sub-paths y and eye sub-paths z, and splitting the transport matrix into a plurality of M sub-matrices:

$$M_t^s = \{M_{(t,q)}^{(s,p)}\}_{p,q} \tag{7}$$

which contains all paths of length s+t+1 with s+1 light vertices and t+1 eye vertices.

It can be shown that the following quantity:

$$F_j(Y, Z) = F_j(M) = \frac{1}{N^2}\sum_{p,q} F_j(\overline{x}^{p,q}) \tag{9}$$

$$= \frac{1}{N^2}\sum_{p,q}\sum_{s,t} w_{s,t}(\overline{x}_{s,t}^{p,q})\frac{f_j(\overline{x}_{s,t}^{p,q})}{p(\overline{x}_{s,t}^{p,q})}$$

$$= \frac{1}{N^2}\sum_{p,q}\sum_{s,t} w_{s,t}(y_0^p \ldots y_s^p z_t^q \ldots z_0^q)$$

$$\frac{f_j(y_0^p \ldots y_s^p z_t^q \ldots z_0^q)}{p(y_0^p \ldots y_s^p z_t^q \ldots z_0^q)}$$

is an unbiased estimator of $I_j$, i.e., that:

$$I_j = E[F_j(Y,Z)] \tag{10}$$

By moving out the summation on (s,t), the operator $F_j(Y,Z)$ can be decomposed into a sum of operators $F_j^{s,t}$ on the matrix sub-blocks:

$$F_j(Y, Z) = \frac{1}{N^2}\sum_{s,t} F_j^{s,t}(M_t^s) \tag{11}$$

$$F_j^{s,t}(M_t^s) = \sum_{p,q} w_{s,t}(\overline{x}_{s,t}^{p,q})\frac{f_j(\overline{x}_{s,t}^{p,q})}{p(\overline{x}_{s,t}^{p,q})}$$

Accordingly, for each sampling technique (s,t), the sum in $F_j^{s,t}$ can be evaluated using the Monte Carlo method. That is to say, if $(p_i, q_i)$ are R random pairs of indices distributed according to $h(p_i, q_i) > 0$, then:

$$F_j^{s,t}(M_t^s) \approx \qquad (12)$$

$$\frac{1}{R} \sum_{i=1}^{R} \frac{w_{s,t}(y_0^{p_i} \ldots y_s^{p_i} z_t^{q_i} \ldots z_0^{q_i})}{h(p_i, q_i)} \frac{f_j(y_0^{p_i} \ldots y_s^{p_i} z_t^{q_i} \ldots z_0^{q_i})}{p(y_0^{p_i} \ldots y_s^{p_i} z_t^{q_i} \ldots z_0^{q_i})}$$

The function h represents a sampling density describing the selection probability of each matrix element. The condition h>0 reflects that the probability of selecting any cell is greater than 0. This result allows optimization of the variance of equation (11).

It can be further observed that the blocks $M_t^s$ often have low-rank structure. In fact, the connection value between each light vertex $y_s^p$ and any eye vertex $z_t^q$ represents an unbiased estimator of the transport due to the light sub-path $y_0^p \ldots y_s^p$ on the eye sub-path $z_0^q \ldots z_t^q$. Therefore, if changes in the bidirectional refraction distribution function are relatively coherent, similar light sub-paths of the same length will tend to transport a similar amount of light to the same eye sub-paths. The converse is similarly holds: similar eye sub-paths will lead to similar importance transport on the same light sub-path.

Accordingly, equation (12) can be seen as a stochastic sum over the entries of the matrix M, or alternatively, as an integral over a 2-dimensional discrete surface, which in the sequel will be referred to as connection space. A well known result in the Monte Carlo literature is that stratified sampling can reduce the variance of such integrals, and that the resulting variance is proportional to the variance of the underlying function in the given strata.

It can be further observed that due to the typical coherence of the light transport field that if neighboring columns (alternatively, rows) represent spatially proximate light sub-path vertices (alternatively, eye sub-path vertices), applying stratified or low discrepancy sampling in connection space would result in producing stratified connection rays in ordinary space. Hence, columns and/or rows can be ordered to further minimize variance of the estimated light transport.

Figure 4:
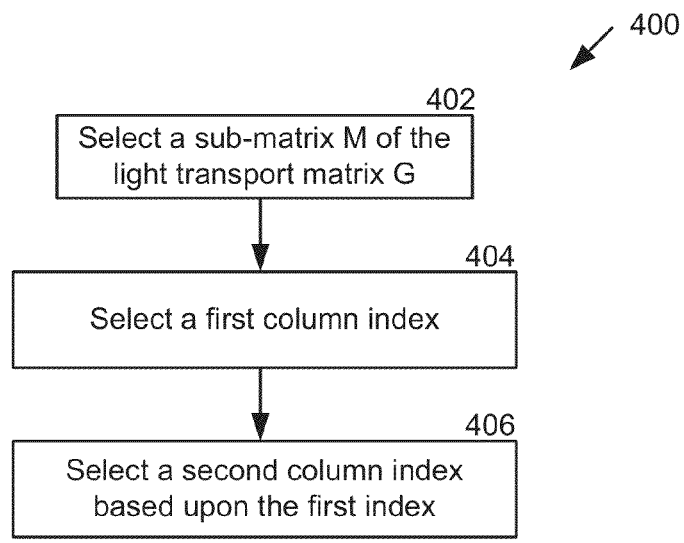
FIG. 4 illustrates an exemplary embodiment of ordering column indices of the light transport matrix shown in FIG. 3 in accordance with the present invention.

FIG. 4 illustrates an exemplary embodiment of ordering column indices of the light transport matrix G in accordance with the present invention. At 402, one of the plurality of sub-matrices M are selected. At 404, one of the column indices of the sub-matrix is selected as a first column index, e.g., by random selection. At 406, a second column index among the remaining column indices is selected based upon selection of the first column.

Operations 402 and 404 may each be performed through random or quasi-random selection. Alternatively, other selection processes may be used, e.g. interleaved sampling.

Figure 5:
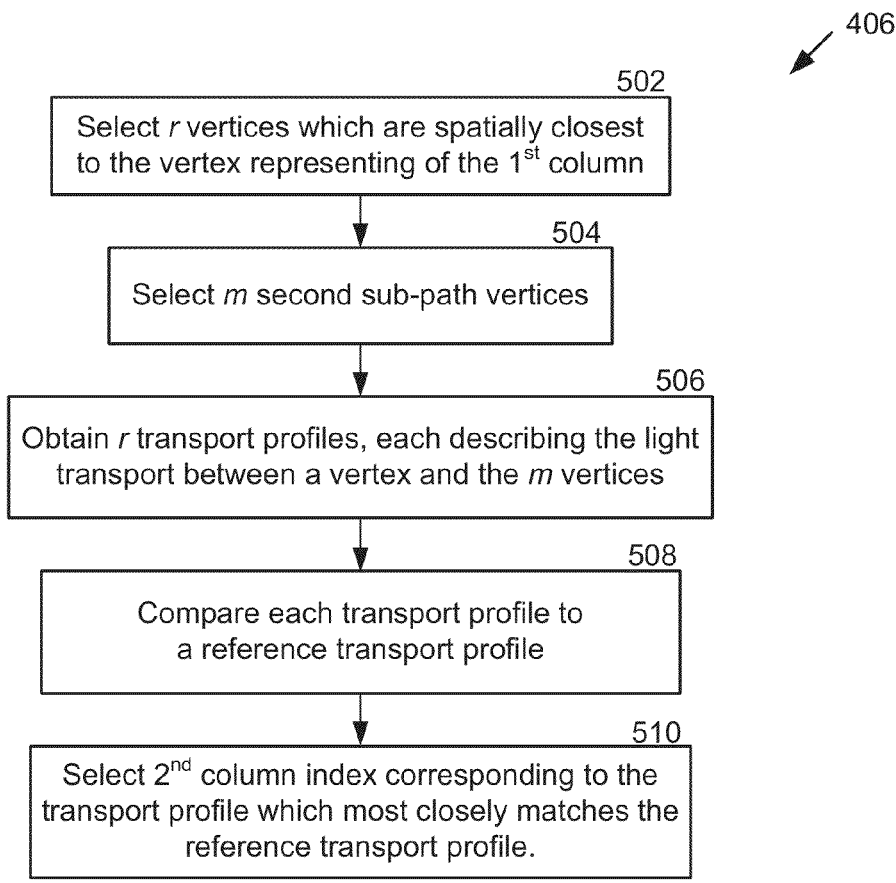
FIG. 5 illustrates an exemplary method for selecting a subsequent column index of the light transport matrix shown in FIG. 3 in accordance with the present invention.

FIG. 5 illustrates an exemplary embodiment of operation 406 in which a subsequent column index is selected in accordance with the present invention. At 502, a predefined number of r vertices are selected which are spatially closest to the terminating vertex of the selected first sub-path, i.e., the first selected column index. At 504, a plurality of m second sub-path vertices is selected. At 506, a total of r transport profiles are obtained, each profile describing the light transport between one of the r vertices and each of the m vertices. At 508, each of the r transport profiles is compared to a reference transport profile. The reference transport profile is obtained by determining the light transport between a reference vertex and each of the m vertices, the reference vertex in this case being the vertex representing the first column index. At 510, one of the r transport profiles is identified as being the most similar to the reference light profile, and the first sub-path having the vertex which corresponds to the closest matching light transport profile is selected as the second column index. Different matching conditions can be used as a metric, e.g., spatial proximity. In another embodiment, the matching conditions include any other high dimensional metric.

In an exemplary embodiment of operation 506, the light transport between a vertex and each of the m vertices is expressed as a vector having m different contributions, whereby each of the r vertices has an m-dimensional vector associated therewith. Continuing with this exemplary embodiment, operation 508 can be implemented by comparing each of the r m-dimensional vectors to a reference vector, the reference vector representing the light transport between the terminating vertex of the selected first sub-path (i.e., the first selected column) and each of the m vertices. Operation 510 is carried out by identifying one of the r m-dimensional vectors as most closely matching the reference vector, and the vertex corresponding to that vector is selected as the second column index.

Figure 6A:
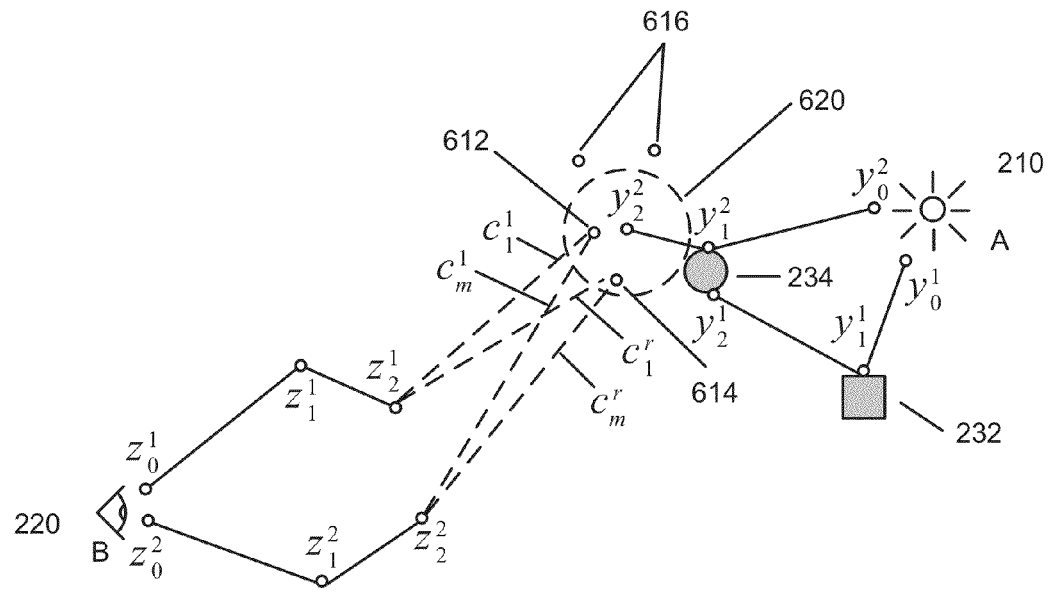
FIGS. 6A and 6B illustrate the method of FIG. 5 in accordance with the present invention.
Figure 6B:
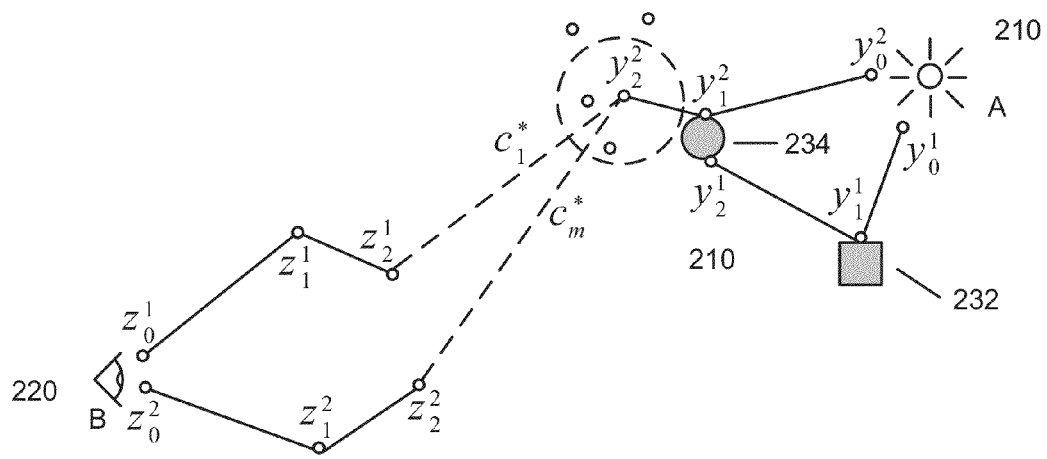

FIGS. 6A and 6B illustrate the method of FIG. 5 in accordance with the present invention, with previously identified features retaining their reference indicia. FIG. 6A illustrates the operations of 502-506, in which a first sub-path terminating with vertex $y_2^2$ is selected, i.e., chosen as the first (or previous) column index. Further illustrated, the selected range 620 includes two vertices 612 and 614 and vertices 616 are outside of the selected range 620. In this case, r=2, although any number may be implemented, e.g., $2^1$-$2^{10}$. In a particular embodiment, the spatially-closest vertices are determined using Euclidean distance measurements, although other techniques may be used. Vertices 612 and 614 represent terminating vertices of two first sub-paths, each sub-path having a length of 2 segments (a total of three vertices); the intervening vertices and line segments are not shown in order to prevent obscuring the drawing.

In operation 504, second sub-path vertices $z_2^1$ and $z_2^2$ are selected as the set of m vertices to/from which the light transport will be evaluated, i.e., m=2. At 506, two vectors are formed;

$$\vec{c}^1 = \{c_1^1, c_m^1\}$$

where $c_1^1$ represents the light transport between 612 and $z_2^1$, and where $c_m^1$ represents the light transport between 612 and $z_2^2$;

$$\vec{c}^r = \{c_1^r, c_m^r\}$$

where $c_1^r$ represents the light transport between 614 and $z_2^1$, and where $c_m^{r1}$ represents the light transport between 614 and $z_2^1$. In a particular embodiment, the value of m is on the same order as r, i.e., $2^1$-$2^{10}$.

FIG. 6B illustrates the formation of the reference vector to which each of the r m-dimensional vectors are compared. The vertex $z_2^1$ represents the terminating vertex of the first (or previously chosen) first sub-path, i.e., the first/previously chosen column of sub-matrix M. The reference vector $$\vec{c}^* = \{c_1^*, c_m^*\} \quad (5)$$

where $c_1^*$ represents the light transport between $y_2^2$ and $z_2^1$, and where $c_m^*$ represents the light transport between $y_2^2$ and $z_2^2$.

In operation 510, each of vectors $\vec{c}^1$ and $\vec{c}^2$ are compared to the reference vector $\vec{c}^*$, and the closest of those vectors to the reference vector is identified. In a particular embodiment, the comparison is made by determining which vector $c_i$ provides the smallest distance to the reference vector $c^*$ using the equation:

$$d(c_i, c^*) = \|\vec{c}_i - \vec{c}\| \cdot \|c_i\| \cdot \|c^*\| \quad (13)$$

The terminating vertex of that closest vector is selected, and the first sub-path having that terminating vertex is selected as the second/subsequent column index for the sub-matrix.

As will be appreciated, the operations of 502-510 can be repeated for the selection of a third/subsequent column index. In such an embodiment, operation 502 would involve selecting a plurality of r vertices spatially closest to the terminating vertex of the second/previously-selected first sub-path. Operation 508 would involve comparing each vector to a reference vector, the reference vector in this case being based upon the terminating vertex of the second/previously selected sub-path.

Further exemplary, the aforementioned operation 402-406 and 502-510 can be applied to ordering the rows of a sub-matrix M. For example, operation 402-406 would involve selecting a sub-matrix M, selecting one of the rows of the sub-matrix as being a first row, and selecting a second/subsequent row based upon the first row. In essence, the aforementioned processes are reversed, and taken from the perspective of the second sub-paths toward the first sub-paths.

In a detailed embodiment of 406, operation 502 would involve selecting a predefined number of r vertices spatially-closest to the terminating vertex of the selected second sub-path, i.e., the first selected row. At 504, a plurality of m first sub-path vertices is selected. At 506, a total of r transport profiles are obtained, each profile describing the light transport between one of the r vertices and each of the m vertices. At 508, each of the r transport profiles is compared to a reference transport profile. The reference transport profile is obtained by determining the light transport between a reference vertex and each of the m vertices, the reference vertex in this case being the vertex representing the first row index. At 510, one of the r transport profiles is identified as being the most similar to the reference light profile, and the second sub-path having the vertex which corresponds to the closest matching light transport profile is selected as the second row index.

It is to be noted that within one column of the larger light transport matrix G, different sub-matrices may have different column indices. For example, sub-matrix M(0,0) may have the zero length group $y_0^1, y_0^2, y_0^3 \ldots y_0^N$ as column indices, and sub-matrix M(0,1) may have the one segment group $y_0^1, y_0^2, y_0^3 \ldots y_0^N$ as column indices. In the same manner, row indices for different sub-matrices within the same row of the larger light transport matrix may also differ. Furthermore, the ordering of a particular sub-path group within the sub-matrix may not be sequential based upon the path indicia (or sample number), as ordering of the columns and row indices within a sub-matrix may be performed, as described above. A default ordering scheme may be implement in which sub-paths $y_s^p$ are sorted according to a lexicographic order in which:

$$(s_1, p_1) < (s_1, p_1) \text{iff}[(s_1 < s_2) \text{ or } (s_1 = s_2 \text{ and } p_1 < p_2)] \quad (14)$$

and a similar default ordering also applied to sub-paths $z_t^q$. The light transport matrix 300 shown in FIG. 3 shows this default ordering prior to any of the ordering operations described in FIG. 4 or 5.

By ordering both the column and rows of the sub-matrices in the aforementioned manner, and assuming the low-rank assumption holds, and that m is roughly similar to the rank of $M_t^s$, all possible matrix sub-blocks of all the matrices $M_t^s$ will exhibit low. Consequently, using a low discrepancy sequence to sample the matrix entries for computing equation (9) should lead to superior convergence. Also, due to the improved spatial proximity in the vertices presented by nearby columns and nearby rows, sample proximity in the connection space will result in sample coherence in the space of connecting rays.

It is to be further observed that as $F_j(Y, Z)$ is an unbiased estimator of $I_j$, it is possible to approximate $I_j$ with a sum of the kind:

$$I_j = \frac{1}{P} \sum_{i=1}^{P} F_j(Y_i, Z_i) \quad (15)$$

where $Y_i$ and $Z_i$ are entire familes of independent light and eye sub-paths respectively, and P represents the number of such families. From this it can be seen that the methods described herein are implementable in multiple passes, where each pass generates new light and eye sub-paths, processes the resulting connection matrix, and updates the measurements.

Moreover, even if the results have been presented in terms of a single measurement $I_j$, it should be noted that its possible to evaluate $F_j$ at once for all the values of j sharing almost all the computations. In fact, its just sufficient to notice that the measurement contribution function $f_j$ depends on j only for a single factor $W_e^{(j)}$, which in turn depends only on the first edge of the eye sub-paths. In practice, this means that instead of re-ordering the matrix blocks $M_t^s$ according to the measurement contribution function $f_j$, one could re-order them based on the un-weighted transport value:

$$w_{s,t}(\bar{x}_{s,t}^{p,q}) \frac{f_j(\bar{x}_{s,t}^{p,q})}{p(\bar{x}_{s,t}^{p,q})} \quad (16)$$

and then, when evaluating $F_j^{s,t}$ using equation (12), use the identity:

$$f_j(\bar{x}) = f(\bar{x}) W_e^{(j)}(x_{k-1} \to x_k) \quad (17)$$

to update the values for all the measurements $j=1, \ldots, m$ at the same time (i.e., using the same set of random samples for each j).

It is to be understood that there is no requirement that all sub-paths $\bar{y}^p$ (alternatively, $\bar{z}^q$) have the same number of vertices (i.e. have the same path length). In one embodiment, it can be assumed that each sub-path has an infinite tail made of a virtual vertex such that the BSRF at $\epsilon$ is constantly zero and that $G(\epsilon \leftrightarrow \epsilon) = 1$ The methods illustrated in FIGS. 1, 4 and 5 may be performed in a variety of applications. In one exemplary embodiment, the methods are performed in conjunction with a pixel rendering method, for example, as a part of a fragment shading process in which ray tracing techniques are used to compute fragments/pixel color values. The methods of FIGS. 1, 4, and 5 can be implemented in other applications, such as virtual measurements of the light transport between arbitrary points.

Figure 7:
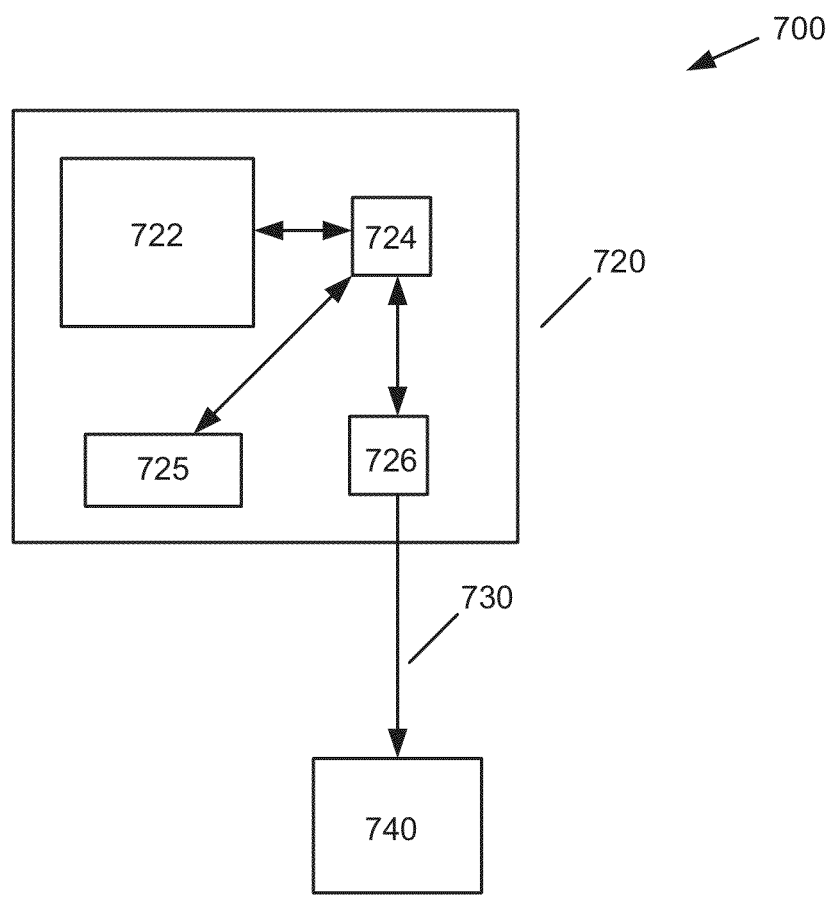
FIG. 7 illustrates an exemplary system in which the methods of FIGS. 1, 4 and 5 finds utility in accordance with the present invention.

FIG. 7 illustrates an exemplary system 700 in which the methods of FIGS. 1, 4 and 5 finds utility in accordance with the present invention. The system 700 includes a graphics processing sub-system 720 and an output device 740, such as a monitor or printer. The graphics processing sub-system 720 includes a processor 722, a memory interface 724, a frame buffer 725, and a scanout processor 726. The processor 722 is operable to perform any or all of the operations illustrated in FIGS. 1, 4, and 5 herein. A frame buffer 726 is operably coupled to the processor 722 for receiving rasterized and raytraced fragment values for each frame, and for reading out a composite image of each frame to the output device 740 via memory interface 424 and link 430 (e.g., a DVI link). In a specific embodiment, the processor 722 is operable to carry out one, several or all of the operations described in any one, several or more of FIGS. 1, 4 and 5. Further, the processor 722 may store instruction code for performing the methods of FIGS. 1, 4 and 5. In an alternative embodiment, system 700 may take on different forms, and processor 720 may be an embedded in such different systems. Further alternatively, the processor 722 may take the form of an application specific integrated circuit or other hardware/firmware circuit operable to carry out the operations illustrated in any one, several or all of FIGS. 1, 4 and 5.

While the foregoing has described the light transport problem in terms of a single source and a single eye/camera points, those skilled in the art will appreciate that the illustrated embodiment may be extended to include multiple light sources. In such an embodiment, each of the multiple light sources would possess an arbitrary area around which a plurality of subpaths may be sampled, and the contribution of each to the eye/camera subpaths determined, as described above.

As readily appreciated by those skilled in the art, the described processes and operations may be implemented in hardware, software, firmware or a combination of these implementations as appropriate. In addition, some or all of the described processes and operations may be carried out as a computer-implemented method, or as computer readable instruction code resident on a computer readable medium, the instruction code operable to control a computer of other such programmable device to carry out the intended functions. The computer readable medium on which the instruction code resides may take various forms, for example, a removable disk, volatile or non-volatile memory, etc.

In a particular embodiment of the invention, a memory is operable to store instructions for performing any of the operations illustrated in FIGS. 1, 4 and 5. The memory may take various forms, e.g., a removable disk, an embedded memory, etc., in volatile or non-volatile form, and may be included within a variety of different systems, e.g. a computer system, an embedded processor, a graphics processor, or graphics processing sub-system, such as a graphics card.

The terms "a" or "an" are used to refer to one, or more than one feature described thereby. Furthermore, the term "coupled" or "connected" refers to features which are in communication with each other, either directly, or via one or more intervening structures or substances. The sequence of operations and actions referred to in method flowcharts are exemplary, and the operations and actions may be conducted in a different sequence, as well as two or more of the operations and actions conducted concurrently. Reference indicia (if any) included in the claims serves to refer to one exemplary embodiment of a claimed feature, and the claimed feature is not limited to the particular embodiment referred to by the reference indicia. The scope of the clamed feature shall be that defined by the claim wording as if the reference indicia were absent therefrom. All publications, patents, and other documents referred to herein are incorporated by reference in their entirety. To the extent of any inconsistent usage between any such incorporated document and this document, usage in this document shall control.

The foregoing exemplary embodiments of the invention have been described in sufficient detail to enable one skilled in the art to practice the invention, and it is to be understood that the embodiments may be combined. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined solely by the claims appended hereto.

What is claimed is:

1. A method for estimating the light transported between a first point A and a second point B, the method comprising:
   selecting, utilizing a processor, a plurality of first sub-paths extending from a first point A;
   selecting a plurality of second sub-paths extending from a second point B, wherein each of the first sub-paths extending from the first point A and the second sub-paths extending from the second point B is defined by both an associated path index, and an associated path length which is defined by an associated terminating vertex;
   constructing a plurality of transport paths, wherein each of the plurality of the first sub-paths is coupled to a respective one of the plurality of the second sub-paths to form one transport path, wherein each transport path comprises one first sub-path and one second sub-path, and wherein constructing the plurality of transport paths comprises:
      constructing a light transport matrix by sorting the plurality of first sub-paths into a plurality of different first sub-path groups, and sorting the plurality of second sub-paths into a plurality of different second sub-path groups;
      wherein each of the first sub-path groups and each of the second sub-path groups collectively form a different sub-matrix within the light transport matrix, each sub-matrix comprising a plurality of column indices and a plurality of row indices, wherein each column index corresponds to one of the first sub-paths, and each row index corresponds to one of the second sub-paths, and wherein a plurality of the sub-matrices form the light transport matrix;
   ordering the column indices of one or more of the sub-matrices, comprising:
      selecting one of the plurality of sub-matrices,
      selecting a first column index of the selected sub-matrix, the first column index corresponding to one of the first sub-paths defined by a particular path length, and
      selecting, from among a predefined number of remaining column indices, a second column index of the selected sub-matrix based upon the first selected column index, the second column index corresponding to another one of the first sub-paths defined by the particular path length;

sampling two or more of the plurality of the transport paths to obtain a plurality of sampled transport paths; and calculating a light transport value for each of the plurality of sampled transport paths to estimate the light transported between the first point A and the second point B, wherein the light transport value for each of the plurality of sampled transport paths is at least one of a light level, a color, and an intensity.

2. The method of claim 1, wherein the plurality of first sub-paths defines respective column indices and the plurality of second sub-paths defines respective row indices, wherein the light transport matrix includes an entry $G_{ij}$ defined by a respective column i and a respective row j, whereby the entry $G_{ij}$ comprises a light transport value which describes the light transported between the points A and B via a light transport path comprising a combination of a first sub-path corresponding to the column i, and a second sub-path corresponding to the row j.

3. he method of claim 2, wherein each of the first sub-path groups include only first sub-paths defined by the same path length, and each of the second sub-path groups include only second sub-paths defined by the same path length.

4. The method of claim 1, wherein selecting a second column index comprises:

(a) selecting a predefined number of r vertices spatially closest to the terminating vertex of the first sub-path representing the first column index;

(b) selecting a plurality of m vertices of the second sub-paths within the selected sub-matrix;

(c) obtaining a plurality of r transport profiles, each of the r transport profiles describing light transport from one of the r vertices to each of the m vertices;

(d) comparing each of the r transport profiles to a reference transport profile; and (e) selecting as the second column index, the first sub-path having the vertex corresponding to the transport profile which most closely matches the reference profile.

5. A method for estimating the light transported between a first point A and a second point B, the method comprising:

selecting, utilizing a processor, a plurality of first sub-paths extending from a first point A;

selecting a plurality of second sub-paths extending from a second point B, wherein each of the first sub-paths extending from the first point A and the second sub-paths extending from the second point B is defined by both an associated path index, and an associated path length which is defined by an associated terminating vertex;

constructing a plurality of transport paths, wherein each of the plurality of the first sub-paths is coupled to a respective one of the plurality of the second sub-paths to form one transport path, wherein each transport path comprises one first sub-path and one second sub-path, and wherein constructing the plurality of transport paths comprises:

constructing a light transport matrix by sorting the plurality of first sub-paths into a plurality of different first sub-path groups, and sorting the plurality of second sub-paths into a plurality of different second sub-path groups, wherein each of the first sub-path groups and each of the second sub-path groups collectively form a different sub-matrix within the light transport matrix, each sub-matrix comprising a plurality of column indices and a plurality of row indices, wherein each column index corresponds to one of the first sub-paths, and each row index corresponds to one of the second sub-paths, and wherein a plurality of the sub-matrices form the light transport matrix;

ordering the row indices of one or more of the sub-matrices, comprising:

selecting one of the plurality of sub-matrices, selecting a first row index of the selected sub-matrix, the first row index corresponding to one of the second sub-paths defined by a particular path length, and selecting, from among a predefined number of remaining row indices, a second row index of the selected sub-matrix based upon the first selected row index, the second row index corresponding to another one of the second sub-paths defined by the particular path length;

sampling two or more of the plurality of the transport paths to obtain a plurality of sampled transport paths; and calculating a light transport value for each of the plurality of sampled transport paths to estimate the light transported between the first point A and the second point B, wherein the light transport value for each of the plurality of sampled transport paths is at least one of a light level, a color, and an intensity.

6. The method of claim 5, wherein selecting a second row index comprises:

(a) selecting a predefined number of r vertices spatially closest to the terminating vertex of the second sub-path representing the first row index;

(b) selecting a plurality of m vertices of the first sub-paths within the selected sub-matrix;

(c) obtaining a plurality of r transport profiles, each of the r transport profiles describing light transport from one of the r vertices to each of the m vertices;

(d) comparing each of the r transport profiles to a reference transport profile; and (e) selecting as the second row index, the second sub-path having the vertex corresponding to the transport profile which most closely matches the reference profile.

7. A pixel rendering method for estimating the light transport between a first point A and a second point B, the method comprising:

selecting, utilizing a processor, a plurality of first sub-paths extending from a first point A;

selecting a plurality of second sub-paths extending from a second point B, wherein each of the first sub-paths extending from the first point A and the second sub-paths extending from the second point B is defined by both an associated path index, and an associated path length which is defined by an associated terminating vertex;

constructing a plurality of transport paths, wherein each of the plurality of the first sub-paths is coupled to a respective one of the plurality of the second sub-paths to form one transport path, wherein each transport path comprises one first sub-path and one second sub-path, and wherein constructing the plurality of transport paths comprises:

constructing a light transport matrix by sorting the plurality of first sub-paths into a plurality of different first sub-path groups, and sorting the plurality of second sub-paths into a plurality of different second sub-path groups, wherein each of the first sub-path groups and each of the second sub-path groups collectively form a different sub-matrix within the light transport matrix, each sub-matrix comprising a plurality of column indices and a plurality of row indices, wherein each column index corresponds to one of the terminating vertices of one of the first sub-paths, and each row index corresponds to one of the terminating vertices of one of the second sub-paths, and wherein a plurality of the sub-matrices form the light transport matrix;

ordering the column indices of one or more of the sub-matrices, comprising:

selecting one of the plurality of sub-matrices, selecting a first column index of the selected sub-matrix, the first column index corresponding to one of the first sub-paths defined by a particular path length, and selecting, from among a predefined number of remaining column indices, a second column index of the selected sub-matrix based upon the first selected column index, the second column index corresponding to another one of the first sub-paths defined by the particular path length;

sampling two or more of the plurality of the transport paths to obtain a plurality of sampled transport paths; and calculating a light transport value for each of the plurality of sampled transport paths to estimate the light transported between the first point A and the second point B, wherein the light transport value for each of the plurality of sampled transport paths is at least one of a light level, a color, and an intensity.

8. The pixel rendering method of claim 7, wherein the plurality of first sub-paths defines respective column indices and the plurality of second sub-paths defines respective row indices, wherein the light transport matrix includes an entry $G_{ij}$ defined by a respective column i and a respective row j, whereby the entry $G_{ij}$ comprises a light transport value which describes the light transported between the points A and B via a light transport path comprising a combination of a first sub-path corresponding to the column i, and a second sub-path corresponding to the row j.

9. The method of claim 8, wherein each of the first sub-path groups include only first sub-paths defined by the same path length, and each of the second sub-path groups include only second sub-paths defined by the same path length.

10. The method of claim 7, wherein selecting a second column index comprises:

(a) selecting a predefined number of r vertices spatially closest to the terminating vertex of the first sub-path representing the first column index;

(b) selecting a plurality of m vertices of the second sub-paths within the selected sub-matrix;

(c) obtaining a plurality of r transport profiles, each of the r transport profiles describing light transport from one of the r vertices to each of the m vertices;

(d) comparing each of the r transport profiles to a reference transport profile; and (e) selecting as the second column index, the first sub-path having the vertex corresponding to the transport profile which most closely matches the reference profile.

11. A pixel rendering method for estimating the light transport between a first point A and a second point B, the method comprising:

selecting, utilizing a processor, a plurality of first sub-paths extending from a first point A;

selecting a plurality of second sub-paths extending from a second point B, wherein each of the first sub-paths extending from the first point A and the second sub-paths extending from the second point B is defined by both an associated path index, and an associated path length which is defined by an associated terminating vertex;

constructing a plurality of transport paths, wherein each of the plurality of the first sub-paths is coupled to a respective one of the plurality of the second sub-paths to form one transport path, wherein each transport path comprises one first sub-path and one second sub-path, and wherein constructing the plurality of transport paths comprises:

constructing a light transport matrix by sorting the plurality of first sub-paths into a plurality of different first sub-path groups, and sorting the plurality of second sub-paths into a plurality of different second sub-path groups, wherein each of the first sub-path groups and each of the second sub-path groups collectively form a different sub-matrix within the light transport matrix, each sub-matrix comprising a plurality of column indices and a plurality of row indices, wherein each column index corresponds to one of the terminating vertices of one of the first sub-paths, and each row index corresponds to one of the terminating vertices of one of the second sub-paths, and wherein a plurality of the sub-matrices form the light transport matrix;

ordering the row indices of one or more of the sub-matrices, comprising:

selecting one of the plurality of sub-matrices, selecting a first row index of the selected sub-matrix, the first row index corresponding to one of the second sub-paths defined by a particular path length, and selecting, from among a predefined number of remaining row indices, a second row index of the selected sub-matrix based upon the first selected row index, the second row index corresponding to another one of the second sub-paths defined by the particular path length;

sampling two or more of the plurality of the transport paths to obtain a plurality of sampled transport paths; and calculating a light transport value for each of the plurality of sampled transport paths to estimate the light transported between the first point A and the second point B, wherein the light transport value for each of the plurality of sampled transport paths is at least one of a light level, a color, and an intensity.

12. The method of claim 11, wherein selecting a second row index comprises:

(a) selecting a predefined number of r vertices spatially closest to the terminating vertex of the second sub-path representing the first row index;

(b) selecting a plurality of m vertices of the first sub-paths within the selected sub-matrix;

(c) obtaining a plurality of r transport profiles, each of the r transport profiles describing light transport from one of the r vertices to each of the m vertices;

(d) comparing each of the r transport profiles to a reference transport profile; and (e) selecting as the second row index, the second sub-path having the vertex corresponding to the transport profile which most closely matches the reference profile.

13. A system operable to estimate the light transport between a first point A and a second point B, the system including a processor operable to:

select a plurality of first sub-paths extending from a first point A;

select a plurality of second sub-paths extending from a second point B, wherein each of the first sub-paths extending from the first point A and the second sub-paths extending from the second point B is defined by both an associated path index, and an associated path length which is defined by an associated terminating vertex;

construct a plurality of transport paths, wherein each of the plurality of the first sub-paths is coupled to a respective one of the plurality of the second sub-paths to form one transport path, wherein each transport path comprises one first sub-path and one second sub-path, and wherein the processor, in constructing the plurality of transport paths, is operable to:

construct a light transport matrix by sorting the plurality of first sub-paths into a plurality of different first sub-path groups, and sorting the plurality of second sub-paths into a plurality of different second sub-path groups, wherein each of the first sub-path groups and each of the second sub-path groups collectively form a different sub-matrix within the light transport matrix, each sub-matrix comprising a plurality of column indices and a plurality of row indices, wherein each column index corresponds to one of the terminating vertices of one of the first sub-paths, and each row index corresponds to one of the terminating vertices of one of the second sub-paths, and wherein a plurality of the sub-matrices form the light transport matrix:

order the column indices of one or more of the sub-matrices, the processor operable to:

select one of the plurality of sub-matrices, select a first column index of the selected sub-matrix, the first column index corresponding to one of the first sub-paths defined by a particular path length, and select, from among a predefined number of remaining column indices, a second column index of the selected sub-matrix based upon the first selected column index, the second column index corresponding to another one of the first sub-paths defined by the particular path length;

sample two or more of the plurality of the transport paths to obtain a plurality of sampled transport paths; and calculate a light transport value for each of the plurality of sampled transport paths to estimate the light transported between the first point A and the second point B, wherein the light transport value for each of the plurality of sampled transport paths is at least one of a light level, a color, and an intensity.

14. The system of claim 13, wherein the plurality of first sub-paths defines respective column indices and the plurality of second sub-paths defines respective row indices, wherein the light transport matrix includes an entry $G_{ij}$ defined by a respective column i and a respective row j, whereby the entry $G_{ij}$ comprises a light transport value which describes the light transported between the points A and B via a light transport path comprising a combination of a first sub-path corresponding to the column i, and a second sub-path corresponding to the row j.

15. The system of claim 14, wherein each of the first sub-path groups include only first sub-paths defined by the same path length, and each of the second sub-path groups include only second sub-paths defined by the same path length.

16. The system of claim 13, wherein the processor, in selecting a second column index, is operable to:

(a) select a predefined number of r vertices spatially closest to the terminating vertex of the first sub-path representing the first column index;

(b) select a plurality of m vertices of the second sub-paths within the selected sub-matrix;

(c) obtain a plurality of r transport profiles, each of the r transport profiles describing light transport from one of the r vertices to each of the m vertices;

(d) compare each of the r transport profiles to a reference transport profile; and (e) select as the second column index, the first sub-path having the vertex corresponding to the transport profile which most closely matches the reference profile.

17. A system operable to estimate the light transport between a first point A and a second point B, the system including a processor operable to:

select a plurality of first sub-paths extending from a first point A;

select a plurality of second sub-paths extending from a second point B, wherein each of the first sub-paths extending from the first point A and the second sub-paths extending from the second point B is defined by both an associated path index, and an associated path length which is defined by an associated terminating vertex;

construct a plurality of transport paths, wherein each of the plurality of the first sub-paths is coupled to a respective one of the plurality of the second sub-paths to form one transport path, wherein each transport path comprises one first sub-path and one second sub-path, and wherein the processor, in constructing the plurality of transport paths, is operable to:

construct a light transport matrix by sorting the plurality of first sub-paths into a plurality of different first sub-path groups, and sorting the plurality of second sub-paths into a plurality of different second sub-path groups, wherein each of the first sub-path groups and each of the second sub-path groups collectively form a different sub-matrix within the light transport matrix, each sub-matrix comprising a plurality of column indices and a plurality of row indices, wherein each column index corresponds to one of the terminating vertices of one of the first sub-paths, and each row index corresponds to one of the terminating vertices of one of the second sub-paths, and wherein a plurality of the sub-matrices form the light transport matrix;

order the row indices of one or more of the sub-matrices, the processor operable to:

select one of the plurality of sub-matrices, select a first row index of the selected sub-matrix, the first row index corresponding to one of the second sub-paths defined by a particular path length, and select, from among a predefined number of remaining row indices, a second row index of the selected sub-matrix based upon the first selected row index, the second row index corresponding to another one of the second sub-paths defined by the particular path length;

sample two or more of the plurality of the transport paths to obtain a plurality of sampled transport paths; and calculate a light transport value for each of the plurality of sampled transport paths to estimate the light transported between the first point A and the second point B, wherein the light transport value for each of the plurality of sampled transport paths is at least one of a light level, a color, and an intensity.

18. The system of claim 17, wherein the processor, in selecting a second row index, is operable to:
  (a) select a predefined number of r vertices spatially closest to the terminating vertex of the second sub-path representing the first row index;
  (b) select a plurality of m vertices of the first sub-paths within the selected sub-matrix;
  (c) obtain a plurality of r transport profiles, each of the r transport profiles describing light transport from one of the r vertices to each of the m vertices;
  (d) compare each of the r transport profiles to a reference transport profile; and
  (e) select as the second row index, the second sub-path having the vertex corresponding to the transport profile which most closely matches the reference profile.

19. A computer program product, resident on a non-transitory computer readable medium, for estimating the light transport between a first point A and a second point B, the computer program product comprising:
  instruction code to select a plurality of first sub-paths extending from a first point A;
  instruction code to select a plurality of second sub-paths extending from a second point B, wherein each of the first sub-paths extending from the first point A and the second sub-paths extending from the second point B is defined by both an associated path index, and an associated path length which is defined by an associated terminating vertex;
  instruction code to construct a plurality of transport paths, wherein each of the plurality of the first sub-paths is coupled to a respective one of the plurality of the second sub-paths to form one transport path, wherein each transport path comprises one first sub-path and one second sub-path, and wherein the instruction code to construct the plurality of transport paths comprises:
    instruction code to construct a light transport matrix by sorting the plurality of first sub-paths into a plurality of different first sub-path groups, and sorting the plurality of second sub-paths into a plurality of different second sub-path groups,
    wherein each of the first sub-path groups and each of the second sub-path groups collectively form a different sub-matrix within the light transport matrix, each sub-matrix comprising a plurality of column indices and a plurality of row indices, wherein each column index corresponds to one of the terminating vertices of one of the first sub-paths, and each row index corresponds to one of the terminating vertices of one of the second sub-paths, and
    wherein a plurality of the sub-matrices form the light transport matrix;
  instruction code to order the column indices of one or more of the sub-matrices, comprising:
    instruction code to select one of the plurality of sub-matrices,
    instruction code to select a first column index of the selected sub-matrix, the first column index corresponding to one of the first sub-paths defined by a particular path length, and
    instruction code to select, from among a predefined number of remaining column indices, a second column index of the selected sub-matrix based upon the first selected column index, the second column index corresponding to another one of the first sub-paths defined by the particular path length;
  instruction code to sample two or more of the plurality of the transport paths to obtain a plurality of sampled transport paths; and
  instruction code to calculate a light transport value for each of the plurality of sampled transport paths to estimate the light transported between the first point A and the second point B, wherein the light transport value for each of the plurality of sampled transport paths is at least one of a light level, a color, and an intensity.

20. The computer program product of claim 19, wherein
  the plurality of first sub-paths defines respective column indices and the plurality of second sub-paths defines respective row indices,
  wherein the light transport matrix includes an entry $G_{ij}$ defined by a respective column i and a respective row j, whereby the entry $G_{ij}$ comprises a light transport value which describes the light transported between the points A and B via a light transport path comprising a combination of a first sub-path corresponding to the column i, and a second sub-path corresponding to the row j.

21. The computer program product of claim 20, wherein
  each of the first sub-path groups include only first sub-paths defined by the same path length, and
  each of the second sub-path groups include only second sub-paths defined by the same path length.

22. The computer program product of claim 19, wherein the instruction code to select a second column index comprises:
  (a) instruction code to select a predefined number of r vertices spatially closest to the terminating vertex of the first sub-path representing the first column index;
  (b) instruction code to select a plurality of m vertices of the second sub-paths within the selected sub-matrix;
  (c) instruction code to obtain a plurality of r transport profiles, each of the r transport profiles describing light transport from one of the r vertices to each of the m vertices;
  (d) instruction code to compare each of the r transport profiles to a reference transport profile; and
  (e) instruction code to select as the second column index, the first sub-path having the vertex corresponding to the transport profile which most closely matches the reference profile.

23. A computer program product, resident on a non-transitory computer readable medium, for estimating the light transport between a first point A and a second point B, the computer program product comprising:
  instruction code to select a plurality of first sub-paths extending from a first point A;
  instruction code to select a plurality of second sub-paths extending from a second point B, wherein each of the first sub-paths extending from the first point A and the second sub-paths extending from the second point B is defined by both an associated path index, and an associated path length which is defined by an associated terminating vertex;
  instruction code to construct a plurality of transport paths, wherein each of the plurality of the first sub-paths is coupled to a respective one of the plurality of the second sub-paths to form one transport path, wherein each transport path comprises one first sub-path and one second sub-path, and wherein the instruction code to construct the plurality of transport paths comprises:
    instruction code to construct a light transport matrix by sorting the plurality of first sub-paths into a plurality of different first sub-path groups, and sorting the plurality of second sub-paths into a plurality of different second sub-path groups, wherein each of the first sub-path groups and each of the second sub-path groups collectively form a different sub-matrix within the light transport matrix, each sub-matrix comprising a plurality of column indices and a plurality of row indices, wherein each column index corresponds to one of the terminating vertices of one of the first sub-paths, and each row index corresponds to one of the terminating vertices of one of the second sub-paths, and wherein a plurality of the sub-matrices form the light transport matrix;

instruction code to order the row indices of one or more of the sub-matrices, comprising:

instruction code to select one of the plurality of sub-matrices, instruction code to select a first row index of the selected sub-matrix, the first row index corresponding to one of the second sub-paths defined by a particular path length, and instruction code to select, from among a predefined number of remaining row indices, a second row index of the selected sub-matrix based upon the first selected row index, the second row index corresponding to another one of the second sub-paths defined by the particular path length;

instruction code to sample two or more of the plurality of the transport paths to obtain a plurality of sampled transport paths; and instruction code to calculate a light transport value for each of the plurality of sampled transport paths to estimate the light transported between the first point A and the second point B, wherein the light transport value for each of the plurality of sampled transport paths is at least one of a light level, a color, and an intensity.

24. The computer program product of claim 23, wherein instruction code to select a second row index comprises:

(a) instruction code to select a predefined number of r vertices spatially closest to the terminating vertex of the second sub-path representing the first row index;

(b) instruction code to select a plurality of m vertices of the first sub-paths within the selected sub-matrix;

(c) instruction code to obtain a plurality of r transport profiles, each of the r transport profiles describing light transport from one of the r vertices to each of the m vertices;

(d) instruction code to compare each of the r transport profiles to a reference transport profile: and (e) instruction code to select as the second row index, the second sub-path having the vertex corresponding to the transport profile which most closely matches the reference profile.

25. The method of thin 1, wherein a number of the plurality of the first sub-paths extending from the first point A is different than a number of the plurality of the second sub-paths extending from the second point B.

26. The method of claim 1, wherein a number of the plurality of the first sub-paths extending from the first point A is the same as a number of the plurality of the second sub-paths extending from the second point B.

27. The method of claim 3, wherein each of the first sub-path groups including only the first sub-paths defined by the same path length is comprised of first sub-paths having varying path indices, and each of the second sub-path groups including only the second sub-paths defined by the same path length is comprised of second sub-paths having varying path indices.

* * * * *